(12) United States Patent
Stassinopoulos et al.

(10) Patent No.: US 8,589,530 B2
(45) Date of Patent: Nov. 19, 2013

(54) METHOD AND SYSTEM FOR MANAGING A DISTRIBUTED NETWORK OF NETWORK MONITORING DEVICES

(75) Inventors: Dimitris Stassinopoulos, Sunnyvale, CA (US); George Zioulas, Sunnyvale, CA (US); Han C. Wen, San Jose, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 2139 days.

(21) Appl. No.: 11/092,226

(22) Filed: Mar. 28, 2005

(65) Prior Publication Data

US 2006/0253566 A1 Nov. 9, 2006

(51) Int. Cl.
*G06F 15/173* (2006.01)

(52) U.S. Cl.
USPC ......................................... 709/224

(58) Field of Classification Search
USPC .................................. 709/223, 224
See application file for complete search history.

(56) References Cited

U.S. PATENT DOCUMENTS

| | | | | |
|---|---|---|---|---|
| 4,644,532 A * | 2/1987 | George et al. | ............... | 370/255 |
| 5,528,586 A * | 6/1996 | Ebert et al. | ............... | 370/419 |
| 5,948,055 A * | 9/1999 | Pulsipher et al. | ............... | 709/202 |
| 6,189,043 B1 * | 2/2001 | Buyukkoc et al. | ............... | 709/241 |
| 6,339,587 B1 * | 1/2002 | Mishra | ............... | 370/255 |
| 6,385,172 B1 * | 5/2002 | Kataria et al. | ............... | 370/238 |
| 6,401,119 B1 * | 6/2002 | Fuss et al. | ............... | 709/224 |
| 6,484,203 B1 * | 11/2002 | Porras et al. | ............... | 709/224 |
| 6,498,795 B1 * | 12/2002 | Zhang et al. | ............... | 370/400 |
| 6,567,812 B1 * | 5/2003 | Garrecht et al. | ............... | 707/708 |
| 6,625,648 B1 * | 9/2003 | Schwaller et al. | ............... | 709/224 |
| 6,675,209 B1 * | 1/2004 | Britt | ............... | 709/224 |
| 6,678,250 B1 * | 1/2004 | Grabelsky et al. | ............... | 370/241 |
| 6,704,320 B1 * | 3/2004 | Narvaez et al. | ............... | 370/408 |
| 6,757,745 B1 * | 6/2004 | Hamann et al. | ............... | 709/250 |
| 6,952,727 B1 * | 10/2005 | Lindner et al. | ............... | 709/224 |
| 7,076,543 B1 * | 7/2006 | Kirti et al. | ............... | 709/223 |
| 7,089,428 B2 * | 8/2006 | Farley et al. | ............... | 726/22 |
| 7,185,104 B1 * | 2/2007 | Thorup et al. | ............... | 709/235 |
| 7,225,244 B2 * | 5/2007 | Reynolds et al. | ............... | 709/223 |
| 7,257,081 B2 * | 8/2007 | Rajan et al. | ............... | 370/231 |
| 7,316,016 B2 * | 1/2008 | DiFalco | ............... | 718/102 |
| 7,363,386 B1 * | 4/2008 | Nucci et al. | ............... | 709/241 |
| 7,426,570 B2 * | 9/2008 | Andrzejak et al. | ............... | 709/235 |
| 7,543,052 B1 * | 6/2009 | Cesa Klein | ............... | 709/224 |
| 2002/0065802 A1 * | 5/2002 | Uchiyama | ............... | 707/1 |
| 2002/0186238 A1 * | 12/2002 | Sylor et al. | ............... | 345/736 |
| 2003/0093514 A1 * | 5/2003 | Valdes et al. | ............... | 709/224 |
| 2003/0097461 A1 * | 5/2003 | Barham et al. | ............... | 709/235 |
| 2004/0054505 A1 * | 3/2004 | Lee | ............... | 702/186 |
| 2004/0059811 A1 * | 3/2004 | Sugauchi et al. | ............... | 709/224 |
| 2004/0064583 A1 * | 4/2004 | Dani et al. | ............... | 709/241 |
| 2004/0073659 A1 * | 4/2004 | Rajsic et al. | ............... | 709/224 |
| 2005/0037789 A1 * | 2/2005 | Rhee et al. | ............... | 455/507 |
| 2005/0128952 A1 * | 6/2005 | Challener et al. | ............... | 370/241 |
| 2006/0184655 A1 * | 8/2006 | Shalton | ............... | 709/223 |
| 2006/0218267 A1 * | 9/2006 | Khan et al. | ............... | 709/224 |
| 2007/0118638 A1 * | 5/2007 | Ban et al. | ............... | 709/224 |
| 2013/0159221 A1 * | 6/2013 | Thompson | ............... | 706/12 |
| 2013/0159502 A1 * | 6/2013 | Thompson | ............... | 709/224 |

* cited by examiner

*Primary Examiner* — Imad Hussain

(74) *Attorney, Agent, or Firm* — Robert M. McDermott

(57) ABSTRACT

Network traffic information for nodes of a first logical hierarchy is stored at a monitoring device according to ranks of the nodes within the logical hierarchy as determined by each node's position therein and user preferences. At least some of the network traffic information stored at the network monitoring device may then be reported to another network monitoring device, where it can be aggregated with similar information from other network monitoring devices. Such reporting may occur according to rankings of inter-node communication links between nodes of different logical hierarchies of monitored nodes.

19 Claims, 2 Drawing Sheets

METHOD AND SYSTEM FOR MANAGING A DISTRIBUTED NETWORK OF NETWORK MONITORING DEVICES

FIELD OF THE INVENTION

The present invention relates to: (a) the management of data stored by individual network monitoring devices, for example where such network monitoring devices are configured to store network traffic information relating to logical groupings of network nodes, and (b) managing data stored by such network monitoring devices when arranged in a distributed network of their own (i.e., a network monitoring device network).

BACKGROUND

Today, information technology professionals often encounter a myriad of different problems and challenges during the operation of a computer network or network of networks. For example, these individuals must often cope with network device failures and/or software application errors brought about by such things as configuration errors or other causes. Tracking down the sources of such problems often involves analyzing network and device data collected by monitoring units deployed at various locations throughout the network.

Traditional network monitoring solutions group network traffic according to whether a network node is a "client" or a "server". More advanced processes, such as those described in co-pending patent application Ser. No. 10/937,986, filed Sep. 10, 2004, assigned to the assignee of the present invention and incorporated herein by reference, allow for grouping data by the role being played by a network node and/or by logical units (business units) constructed by network operators for the purpose of monitoring and diagnosing network problems. These forms of advanced monitoring techniques can yield very good results in terms of providing operators with information needed to quickly diagnose and/or solve problems.

With these advanced forms of network monitoring, however, come problems. For example, collecting and storing data for all logical groupings of nodes and inter-nodal communications paths in a network quickly becomes unmanageable as that network grows in size. Consequently, what are needed are methods and systems to facilitate centralized network monitoring for large, distributed networks.

SUMMARY OF THE INVENTION

In one embodiment of the present invention network traffic information for those of a first logical hierarchy of monitored network nodes which can be accommodated by a first network monitoring device is stored according to ranks of the monitored network nodes within the logical hierarchy as determined by a node's position therein and user preferences. At least some of the network traffic information stored at the first network monitoring device may then be reported from the first network monitoring device to a second network monitoring device of the network monitoring device network, e.g., acting as a centralized network monitoring device. For example, the second network monitoring device may receive that portion of the network traffic information stored at the first network monitoring device according to rankings of inter-node communication links between nodes of the first logical hierarchy of monitored network nodes of the first network monitoring device and others nodes of a second logical hierarchy of monitored network nodes of a third network monitoring device of the network monitoring device network. Such rankings of inter-node communication links may be determined according to ranks of individual nodes associated with the communication links within corresponding ones of the first and second logical hierarchies of nodes, each such rank being determined according to a first distance measured from a root node of a hierarchy under consideration to a node under consideration, a second distance measured from a leaf node of the hierarchy under consideration to the node under consideration and user preferences. Also, the ranks of the monitored network nodes within the first logical hierarchy of nodes of the first network monitoring device may be determined according to a first distance measured from a root node of the hierarchy to a node under consideration and a second distance measured from a leaf node of the hierarchy to the node under consideration and user preferences.

In further embodiments of the present invention, nodes of a grouping of nodes within a network are ranked, at a first network monitoring device, according to each node's position within a logical hierarchy of the nodes of the grouping and user preferences; and network traffic data associated with the nodes of the grouping of nodes is stored or not stored according to each node's rank as so determined. Thereafter, at least some of the network traffic data stored according to each node's rank may be transferred from the first network monitoring device to a second network monitoring device, for example if said rank satisfies additional ranking criteria concerning communications between nodes of different groupings.

Yet another embodiment of the present invention allows for aggregating, at a network monitoring device, network traffic information for inter-node communications between nodes of different logical groupings of nodes, said logical groupings of nodes including groupings defined in terms of other logical groupings of nodes, according to ranks of individual nodes within each of the different logical groupings associated with the inter-node communications, each such rank being determined according to a first distance measured from a root node of a logical hierarchy of a one of the logical groupings of nodes under consideration to a node thereof under consideration, a second distance measured from a leaf node of the logical hierarchy of the one of the logical groupings under consideration to the node under consideration and user preferences. Such aggregating may proceed incrementally for each branch of a logical group-to-logical group hierarchy constructed by the network monitoring device.

BRIEF DESCRIPTION OF THE DRAWINGS

The present invention is illustrated by way of example, and not limitation, in the figures of the accompanying drawings in which.

DETAILED DESCRIPTION

Figure 1:
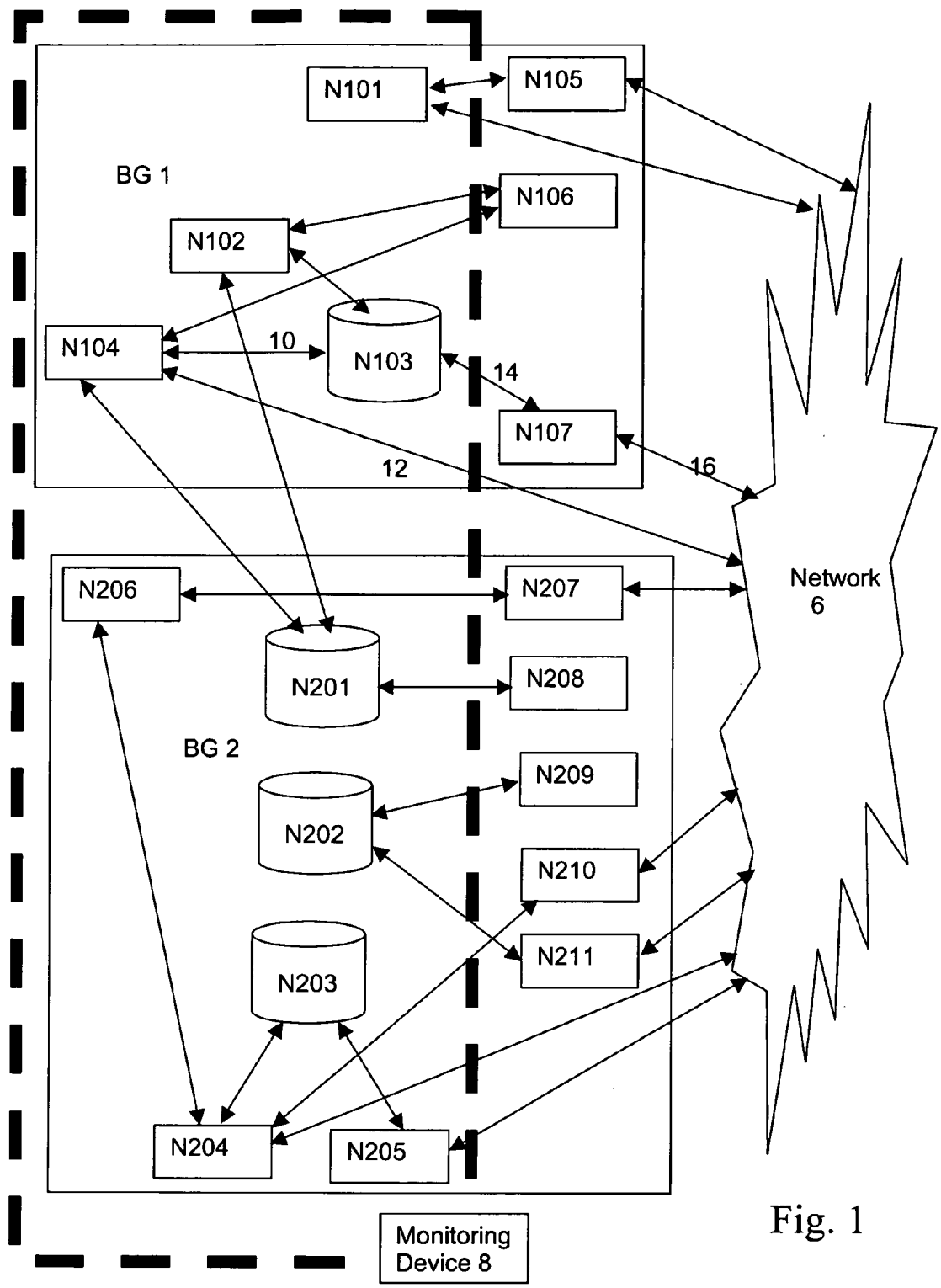
FIG. 1 illustrates an example of a computer network and its associated network monitoring device.

Described herein are methods and systems to facilitate network monitoring for computer networks. The present invention encompasses both the management of data stored by individual network monitoring devices, for example where such network monitoring devices are configured to store network traffic information relating to logical groupings of network nodes, and data stored by such network monitoring devices when arranged in a distributed network of their own (i.e., a network monitoring device network). First to be described will be the management of data stored by individual network monitoring devices. Thereafter, techniques for aggregating and managing the storage of such data among a network of monitoring devices will be presented.

For the first case, managing data stored by individual monitoring devices, consider that for large, distributed networks there may exist many (potentially hundreds or even thousands) of node-to-node communication links. Here we refer not strictly to the physical inter-node communication links (e.g., optical fibers, copper wires, and the like), but rather to the virtual or logical node-to-node connections that permit communication between two or more nodes in one or more computer networks. Because of constraints on the amount of physical memory available to a network monitoring device, it becomes at the very least impractical (and quickly impossible) to collect and store network traffic data for all of these multiple inter-node communication links for a network of any appreciable size. Indeed, the situation becomes even worse (from a need for storage viewpoint) if the nodes are grouped in some fashion, for now one must consider not only the individual node-to-node communications but also the group-to-group communications, which themselves may exist at multiple levels. Consequently, decisions about what data and/or which nodes/communication links should be monitored must be made (to meet capacity limits of the network monitoring devices); all the while remembering that network operators will still require sufficient information regarding network traffic conditions in order to make informed decisions regarding network operations and control.

In a first aspect of the present invention, these needs are addressed by a methodology for determining which nodes/links (i.e., the network traffic data associated with such monitored nodes and/or links) to track in one or a set of monitoring devices, to ensure data integrity. In this procedure, each network monitoring device collects data for designated nodes/communication links in a computer network or network of networks. Where necessary, the nodes/links are ranked and decisions are made based on such rankings if it is necessary to discard data relating to any monitored nodes/links in order not to exceed storage and/or processing capacity of a network monitoring device. As will be more fully discussed below, in one embodiment such ranking is a function of an individual node's distance from a root and/or leaf position within a logical hierarchy describing the arrangement of the nodes of the subject network as well as other factors (e.g., user preferences).

Then, for the second case of managing the aggregation and storage of monitored data among a network of monitoring devices, we introduce the concept of "Appliances" and a "Director". As used herein, the term Appliance will be applied to those network monitoring devices assigned to collect network traffic data from designated nodes/links of one or more networks. The Director will be a central network monitoring device to which the Appliances send specified information concerning designated ones of the monitored nodes/links. Together, the Director and the Appliances form a network of network monitoring devices.

Just as the individual network monitoring devices (the Appliances) were limited in their ability to store network traffic data concerning all of the myriad inter-node communication links, so too is the Director limited in its ability to store network traffic data received from the Appliances. Hence, the present invention further encompasses techniques for making decisions about which data concerning the monitored nodes/links to pass from the Appliances to the Director. As was the case for the individual Appliances, such decisions involve rankings of nodes/links. In this way, network operators using the Director monitoring device may readily gain access to network diagnostic information at a single monitoring device while at the same time that monitoring device is not overwhelmed with information concerning the numerous network nodes and communication links.

As will become apparent, the ability to group various network nodes/links into logical units and to further group these logical units into higher layer units provides for many of the advantages of the present methods and will be discussed before presenting details of the various ranking algorithms used in connection with the present invention. Before doing so, however, it is important to remember that for purposes of explanation numerous specific details are set forth herein in order to provide a thorough understanding of the invention. However, it will be appreciated by one with ordinary skill in the art that these specific details need not be used to practice the present invention. In other instances, well-known structures and devices are shown in block diagram form in order to avoid unnecessarily obscuring the present invention.

The methods described herein may be used in conjunction with other techniques to allow network operators to detect problems and/or discover relevant information with respect to network application usage/performance and then isolate the problem/information to specific contributors (e.g., users, applications or network resources). More particularly, the present methods involve computations and analyses regarding many variables and are best performed or embodied as computer-implemented processes or methods (a.k.a. computer programs or routines) that may be rendered in any computer programming language including, without limitation, C#, C/C++, Fortran, COBOL, PASCAL, assembly language, markup languages (e.g., HTML, SGML, XML, VoXML), and the like, as well as object-oriented languages/environments such as the Common Object Request Broker Architecture (CORBA), Java™ and the like. In general, however, all of the aforementioned terms as used herein are meant to encompass any series of logical steps performed in a sequence to accomplish a given purpose.

In view of the above, it should be appreciated that some portions of this detailed description of the present invention are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the present invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

As indicated above, before describing the various ranking processes used as a basis for determining which information to store at a network monitoring device, the manner in which such information is collected will first be discussed. Turning then to FIG. 1, a computer network including multiple logical groupings (e.g., BG1, BG2) of network nodes is illustrated. Logical groupings such as BG1 and BG2 may be defined at any level. For example, they may mirror business groups, or may designate computers (or other nodes, e.g., printers, servers, image processors, scanners, or other computer equipment generally addressable within a computer network) performing similar functions, computers located within the same building, or any other aspect which a user or network operator/manager wishes to highlight. FIG. 1 shows one simple organization of a small number of computers and other network nodes, but those familiar with computer network operations/management will appreciate that the number of computers and network nodes may be significantly larger as can the number of connections (communication links) between them. Modem network configurations are mutable and complex, which is one of the reasons why the present invention is useful. Information representing the total utilization of all nodes in particular directions or activities provides much greater visibility into overall network traffic than does a large collection of individualized node information. The present invention allows for the grouping of network traffic into logical groups and groups of logical groups that a user can configure in order to allow visibility of network traffic at various hierarchical levels.

In FIG. 1 lines between nodes and other entities are meant to indicate network communication links, which may be any mode of establishing a connection between nodes including wired and/or wireless connections. Moreover, a firewall (shown as the dashed line) surrounds a geographic collection of networked nodes and separates components of an internal network from an external network 6. A network traffic monitoring device 8 is shown at the firewall. However, the network traffic monitoring device 8 may be located within the internal network, or the external network 6 or anywhere that allows for the collection of network traffic information. Moreover, network traffic monitoring device 8 need not be "inline." That is, traffic need not necessarily pass through network traffic monitoring device 8 in order to pass from one network node to another. The network traffic monitoring device 8 can be a passive monitoring device, e.g., spanning a switch or router, whereby all the traffic is copied to a switch span port which passes traffic to network traffic monitoring device 8.

In the example shown in FIG. 1, BG1 contains several internal network nodes N101, N102, N103, and N104 and external nodes N105, N106 and N107. Similarly, BG2 contains several internal network nodes N201, N202, N203, N204, N205, N206, and external nodes N207, N208, N209, N210 and N211. A network node may be any computer or device on the network that communicates with other computers or devices on the network. Each node may function as a client, server, or both. For example, node N103, is shown as a database which is connected to Node N104, a web application server, via a network link 10. In this configuration, it is typical for node N104 to function as a client of node N103 by requesting database results. However N104 is also depicted as connected to the external network 6 via network link 12. In this configuration, it is typical for N104 to function as a server, which returns results in response to requests from the external network. Similarly, database node N103, which functions as a server to N104, is shown connected to node N107 via a network link 14. N107 may upload information to the database via link 14, whereby N107 is functioning as a server and N103 is functioning as a client. However, N107 is also shown connected to the external network 6 via link 16. This link could indicate that N107 is browsing the Internet and functioning as a client.

Furthermore, network nodes need not be within the internal network in order to belong to a logical group. For example, traveling employees may connect to the logical group network via a virtual private network (VPN) or via ordinary network transport protocols through an external network such as the Internet. As shown in FIG. 1, network nodes N105, N106, and N107 belong to logical group BG1, but are outside the firewall, and may be geographically distant from the other network nodes in BG1. Similarly, network nodes N207, N208, N209, N210, and N211 are members of logical group BG2, but are physically removed from the other members of group BG2. It is important to note that the firewall in this configuration is for illustrative purposes only and is not a required element in networks where the present invention may be practiced. The separation between internal and external nodes of a network may be formed by geographic distance (as described above), or by networking paths (that may be disparate or require many hops for the nodes to connect to one another regardless of their geographic proximity).

For a relatively small network such as that shown in FIG. 1, a single network monitoring device 8 may suffice to collect and store network traffic data for all nodes and communication links of interest. However, for a network of any appreciable size (or for a network of networks), this will likely not be the case. Thus decisions about what data to store for which nodes/groups of nodes and/or links/groups of links need to be made.

Figure 3:
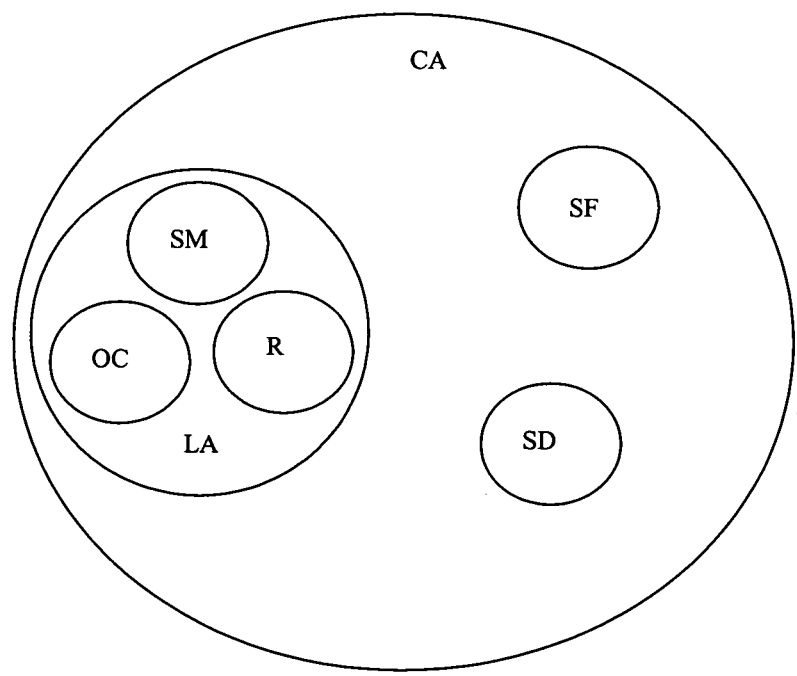
FIG. 3 illustrates an example of a BGO hierarchy in accordance with an embodiment of the present invention.

To further illustrate this point, consider a network monitoring device located in a data center (call it the New York (NY) datacenter) that monitors traffic between the New York office of an enterprise and its remote branch offices around the world. The NY enterprise and each of the branch offices may be organized with multiple logical groups of nodes. We will call each such logical group a "business group" or BG, however, it should be recognized that BGs could be created along any of the lines discussed above (e.g., any user-desired definition). Indeed, some of the BGs may themselves include other BGs, forming what will be termed herein business group organizations or BGOs. See, for example, FIG. 3 in which a BGO called "California" (CA) includes multiple BGs: "San Francisco" (SF), "Los Angeles" (LA), and "San Diego" (SD), each of which may themselves be made up of other BGs (e.g., the Los Angeles BG may include BGs for Santa Monica (SM), Riverside (R) and Orange County (OC)) and/or nodes. Thus, the various BGs may be grouped in various hierarchies, within which there may be many node-to-node and group-to-group (BG-to-BG and/or BGO-to-BGO) connections (representing inter-group communications).

In addition to the above, for each communication link under consideration there are a host of various metrics that might be collected by a network monitoring device. Among these are: Goodput, Payload, Throughput, Transaction Throughput, Packet Loss, Retransmission Delay, Retransmission Rate and Round Trip Time, Application Response Rate, Application Response Time, Client Reset Rate, Connection Duration, Connection Established Rate, Connection Request Rate, Connection Setup Time, Connections Failed Rate, Data Transfer Time, Server Reset Rate and Time to First Byte. These metrics can be further subdivided on the basis of the role being played by the content originator and the content requester. Thus, as this exercise should make clear, for networks (or networks of networks) of any appreciable size there are far too many data points for a single monitoring device to cope with. That is, a single device cannot reasonably store data concerning all of the various communication links within such a network (e.g., due to limits on physical storage devices, bandwidth utilization, etc.) and so decisions about what data to store and what data not to store at the monitoring device need to be made.

The solution provided by the present invention allows for such decision-making. In one embodiment of the invention, a network monitoring device consults user-supplied definitions of the BGs/BGOs for which it is responsible and "builds" a BG/BGO hierarchy. The definitions of the BGs/BGOs may be stored locally at a network monitoring device or may be stored in a central location to which a network monitoring device has access. These definitions comprise configuration files that include user-supplied instructions regarding the BGs and BGOs to be monitored and will, generally, define the types of statistics or metrics for which data is to be collected and the organization of the network nodes. The precise details of such instructions are not critical to the present invention and in some cases such instructions may be provided by manually configuring a network and its associated monitoring devices on a port-by-port level. What is important is that the network monitoring device has some means of determining which nodes it is responsible for monitoring.

With the BGO information made available, a network monitoring device constructs its relevant BGO hierarchy. In doing so, the network monitoring device considers only those links which are active; that is, those links which have active communications taking place. The BGO hierarchy may be regarded as a "tree-like" structure having a root node, branches and leaf nodes. The "root" node represents the highest hierarchical level in the BGO, while the "leaf" nodes represent the lowest such hierarchical levels (e.g., individual computer resources). "Branch" nodes may be nodes interconnecting leaf nodes to the root node and there may be any number of such branch nodes (including none) between the root node and any of the leaf nodes. A branch hierarchy is constructed by combining the network data collected for each of the leaf nodes within a branch and storing that combination with reference to the common branching node from which the leaf nodes depend. For each branch of the BGO hierarchy, and on a branch-by-branch basis (starting with the leaf nodes thereof), decisions are made about whether or not to store the monitored data for those nodes/links.

It should be apparent that in the process of constructing such a hierarchy, where each higher layer includes combined statistics from lower layers, for a hierarchy of any significant depth it may not be possible to store all of the raw data and the combinations thereof for every level of the hierarchical tree. Stated differently, storage and/or processing capabilities of the network monitoring device may demand that some of the data concerning some of the leaf nodes and/or branching nodes of the BGO hierarchy be intentionally dropped.

To accommodate this reality, the present invention provides for ranking and pruning the BGO hierarchy as it is being constructed by the network monitoring device. Importantly, this ranking and pruning process can be performed without the need for the network monitoring device to store data for each node of the entire BGO structure. Thus, the BGO hierarchy can be constructed "on-the-fly", with each branch being pruned as needed during that process so as to accommodate the network monitoring device's storage and/or processing limitations.

The ranking algorithm used by the network monitoring device as it constructs each branch of the BGO hierarchy may be any such process as permits the above-described operations. In one embodiment, the algorithm used is:

$$R_{composite} = F_{devices}(a) + F_{rank}(r) + F_{depth}(d) \tag{1}$$

where $R_{composite}$ is a composite ranking of the node/link under consideration.

In equation (1), $F_{device(a)}$ is proportional to a, the number of monitoring devices designated to have their data for this associated BG or BGO (henceforth referred to as a "node") aggregated onto a central monitoring device (the Director) as discussed in further detail below. $F_{device(a)}$ is intended to give prioritization of the highest ranking to those nodes that need to have their data aggregated to the central monitoring device. Put differently, the $F_{device(a)}$ factor ensures that nodes for which there is at least one monitoring device contributing to the group (i.e., a>0) receive a high ranking. In one embodiment of the present invention, $F_{device(a)}$ is a monotonically increasing function of a, to ensure that preference is given to nodes with higher a value.

The $F_{rank}(r)$ term is a function whose value monotonically decreases with increasing values of r, the distance (measured in the number of nodes) between the associated root or "top" node of the hierarchy and the node associated with $R_{composite}$ (e.g., the number of hops within the BGO hierarchical tree). The $F_{rank}(r)$ term is intended to give preference to nodes that are higher in the BGO tree hierarchy.

The $F_{depth}(d)$ term is a function whose value monotonically increases with increasing values of d, the distance (measured in the number of nodes) between the leaf or "bottom" node of the hierarchy and the node associated with $R_{composite}$. The $F_{depth}(d)$ term is intended for scenarios where there are nodes with the same values for $F_{device}(a)$ and $F_{rank}(r)$, to give preference to those nodes that have "deeper" tree hierarchies, as reflected by the value of d. In one embodiment of the present invention the relative magnitudes of the three terms $F_{device}(a)$, $F_{rank}(r)$ and $F_{depth}(d)$ may be expressed as $F_{device}(a) \gg F_{rank}(r) \gg F_{depth}(d)$, for expected values of a=(0-~100), "r"=(1-~20) and "d"=(1-~20).

The rank ($R_{composite}$) of each node/link is recorded in a database maintained by the network monitoring device. Thereafter, as each branch of the hierarchy is constructed, nodes/links may be pruned (i.e., decisions may be made to drop data collected for such nodes/links) according to such ranks and the storage/processing capacity of the network monitoring device. Alternatively, or in addition, decisions about pruning may be based on thresholds for the number of nodes for which to store data as configured by a user.

The foregoing has thus addressed the need to determine which nodes/links (i.e., the network traffic data associated with such monitored nodes and/or links) to track in an individual network monitoring device. The discussion now turns to the second aspect of the present invention: the case of managing the aggregation and storage of such monitored data among a network of monitoring devices. In this discussion we refer to different types of network monitoring devices, namely Appliances and a central Director.

Earlier it was noted that the network monitoring device 8 illustrated in FIG. 1 may be capable of storing all relevant network traffic information for a relatively small network. However, when the network became large, this was no longer true and so decisions had to be made about what data to store and what data not to store. Consider now the case where not only is the network (or network of networks) under consideration large, but also where more than a single network monitoring device is used.

Returning to the earlier example, such a situation may arise where, for example, in addition to the NY datacenter, an additional datacenter is located in California (CA). Just like NY, the datacenter in CA sends/receives traffic to/from the same set of remote branch offices distributed throughout the world. However, the monitoring device (call it Appliance 1) in NY does not "see" any of this data being transferred through the CA datacenter. That is, Appliance 1 does not capture the traffic to/from the CA datacenter. Therefore, a separate monitoring device (Appliance 2) is deployed in the CA datacenter to monitor traffic to/from that datacenter.

Figure 2:
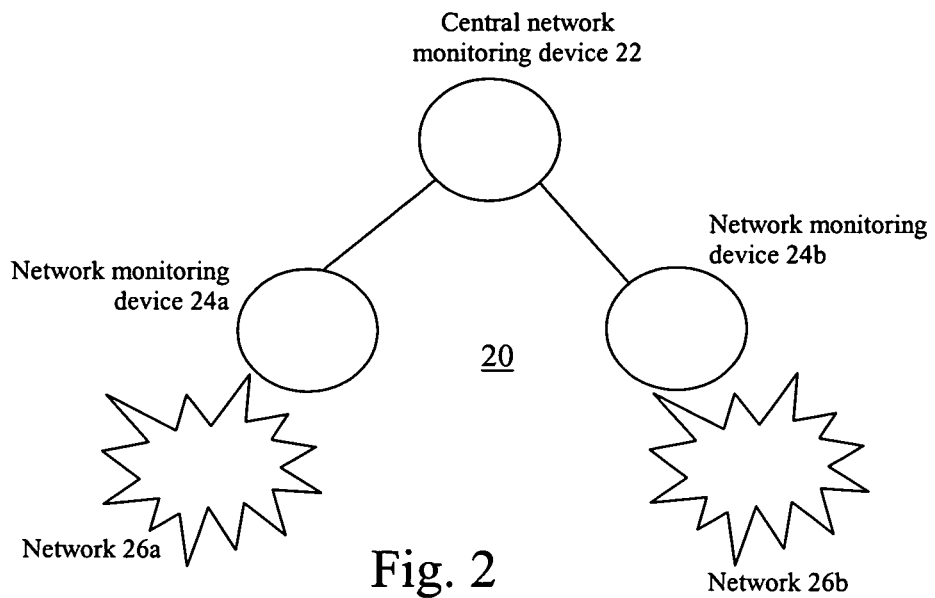
FIG. 2 illustrates an example of a network of network monitoring devices deployed in accordance with an embodiment of the present invention.

But now if a network operator wants to assess the total traffic between the London branch office and each of the NY and CA datacenters, then somehow the information collected by each of the Appliances must be aggregated. In accordance with the present invention, this aggregation is performed at a Director—a central network monitoring device. Collectively, the Director and the various Appliances make up a network of network monitoring devices and FIG. 2 illustrates an example thereof.

Within network 20, central network monitoring device 22 receives and aggregates network traffic information from two individual network monitoring devices $24_a$ and $24_b$. Monitoring device $24_a$ is responsible for collecting network traffic data associated with a first network $26_a$. Monitoring device $24_b$ is responsible for collecting network traffic data associated with a second network $26_b$. Networks $26_a$ and $26_b$ may each include multiple nodes, interconnected with one another and/or with nodes in the other respective network by a myriad of communication links, which may include direct communication links or indirect communication links (e.g., which traverse other networks not shown in this illustration). Thus, each of the network monitoring devices $24_a$ and $24_b$ may be responsible for collecting data concerning multiple groupings (logical and/or physical) of nodes in their associated networks $26_a$ and $26_b$. That is, the network operator may, for convenience, define multiple logical and/or physical groupings of nodes in each of the networks $26_a$ and $26_b$ and configure the respective network monitoring devices $24_a$ and $24_b$ to store and track network traffic information accordingly. The total number of monitored nodes/links may be quite large.

Such a network of network monitoring devices poses several challenges. For example, if the network traffic information associated with the various BG/BGO—to—BG/BGO communications sought by the Director exceeds the storage capacity of the Director, what information for which group-to-group communications should be kept? Also, in order not to overwhelm the available bandwidth within the network of network monitoring devices, how can the volume of information being sent between the Appliances and the Director be kept manageable? Finally, how can one ensure completeness (i.e., integrity) of the information for the various aggregations being performed? For example, if an operator wants all the traffic between London and the two datacenters aggregated, how can the operator be certain that each Appliance has stored traffic between its datacenter and London if each of the Appliances is pruning the number of nodes/links for which it stores traffic in accordance with the above-described processes? The present invention addresses these issues by employing a global ranking process somewhat similar to that discussed above with reference to a single network monitoring device.

Once the individual BGO hierarchies have been constructed by the Appliances, decisions about which data to transfer to the Director can be made. Because the Director will also have limits on the amount of data which it can store/process, a ranking algorithm, which may include a bias for ensuring that any nodes/links which the network operator has indicated should be tracked at this level are always included, for determining what data to store and what data not to store is used. One example of such a ranking algorithm used to select the links to be transferred to the Director is:

$$R'_{composite} = F_{devices}(\max(a_1, a_2)) + F_{rank}(r_{1+r2}) + F_{depth}(r_1 + r_2) \quad (2)$$

where "r", "d" and "a" denote the same metrics as above and the subscripts 1 and 2 indicate the values associated with the different BGs/BGOs which the link under consideration interconnects. For example, in a CA-to-NY BGO-to-BGO example, subscript 1 might designate a node within the CA Appliance hierarchy and subscript 2 might designate a node within the NY Appliance hierarchy.

Thus, based on the rankings of the BGO-to-BGO hierarchical trees on the distributed edge monitoring devices (i.e., the Appliances), a central network monitoring device (the Director) can construct a composite BGO-to-BGO hierarchy encompassing the traffic seen by all the distributed edge monitoring devices. Indeed, this process can be repeated for multiple level network monitoring device hierarchies, which each monitoring device at successively higher layers of the hierarchy receiving data from lower layer devices and pruning BGO-to-BGO hierarchical trees accordingly.

Importantly, the ranking and pruning processes described herein may be implemented at network monitoring devices at any level within a network of network monitoring devices (e.g., one in which first layer Appliances report up to second layer Appliances, which in turn report up to higher layer Appliances, until finally reports are made to a Director). That is, network monitoring devices at any point within a network of such devices may employ such methods to keep network traffic information related to group-to-group communications bounded.

Thus, methods and systems to facilitate centralized network monitoring for distributed networks have been described. Although these methods and systems were discussed with reference to particular embodiments of the present invention, such embodiments should not be read as unnecessarily limiting he scope of the invention. Instead, the invention should only be measured in terms of the claims, which follow.

What is claimed is:

1. A computer-implemented method of monitoring a portion of a network, wherein a network monitoring device among a plurality of network monitoring devices has been assigned to monitor the portion of the network, said method comprising:
    determining, by the network monitoring device, a logical grouping of nodes for the portion of the network to which the network monitoring device has been assigned;
    determining, by the network monitoring device, a hierarchy that ranks nodes within the logical grouping, wherein the network monitoring device prunes the hierarchy based on a capacity of the network monitoring device;
    receiving, by the network monitoring device, network traffic information corresponding to nodes within the logical grouping; and
    selectively storing, by the network monitoring device, network traffic corresponding to the nodes within the logical grouping according to their respective positions within the hierarchy.

2. The computer-implemented method of claim 1, further comprising
    reporting from the network monitoring device to a second network monitoring device at least some of the stored network traffic information based on the ranking of the nodes corresponding to the network traffic information that was received.

3. The computer-implemented method of claim 2, wherein the second network monitoring device receives selected portions of the network traffic information stored by the network monitoring device according to rankings of inter-node communication links between nodes in the logical grouping.

4. The computer-implemented method of claim 3, wherein the rankings of inter-node communication links are determined according to ranks of individual nodes associated with the communication links in the logical grouping.

5. The computer-implemented method of claim 2, wherein the ranks of nodes within the logical grouping are determined according to a first distance measured from a root node of the hierarchy to a node under consideration and a second distance measured from a leaf node of the hierarchy to the node under consideration.

6. A computer-implemented method for monitoring a portion of a network by a network monitoring device, said method comprising:
    defining, by the network monitoring device, a logical grouping of nodes in the network based on instructions supplied from a user, wherein the logical grouping indicates at least a root node for the logical grouping;
    determining, by the network monitoring device, a hierarchy for the nodes within the logical grouping based on their respective distances from the root node;
    ranking, by the network monitoring device, the nodes in the logical grouping according to each node's position within the hierarchy; and
    selectively storing network traffic data associated with the nodes of the logical grouping according to each node's rank and a capacity of the network monitoring device.

7. The computer-implemented method of claim 6, further comprising transferring from the network monitoring device to a second network monitoring device at least some of the network traffic data stored according to each node's rank.

8. The computer-implemented method of claim 7, wherein the network traffic data stored according to each node's rank is transferred to the second network monitoring device if said rank satisfies additional ranking criteria concerning communications between nodes of different groupings.

9. A computer-implemented method of monitoring a network by a plurality of network monitoring devices, wherein the plurality of network devices comprises a set of appliances assigned to monitor portions of the network and a central monitoring device configured to direct the set of appliances, said method comprising:
    assigning, to each of the appliances, respective portions of the network that comprise a logical grouping of nodes, wherein the logical groupings are defined based on one or more user-specified instructions, and wherein the logical groupings comprise a root node;
    determining, by each of the appliances, a ranking for each node in the logical grouping based on proximity of each node to the root node and a hierarchy that arranges the nodes within the logical grouping according to their respective rankings;
    selectively pruning, by each of the appliances, the hierarchy based on a capacity of each appliance;
    defining, by the central monitoring node, a global ranking for nodes in the logical groupings assigned to the appliances; and
    aggregating, at the central monitoring node, network traffic collected by the appliances based on the respective global rankings and a capacity of the central monitoring device.

10. The computer-implemented method of claim 9, wherein said aggregating proceeds incrementally for each branch of the hierarchy constructed by the appliance.

11. The computer-implemented method of claim 9, wherein the global ranks of the nodes are based on one or more user preferences.

12. The system of claim 4, wherein each rank is also determined based on one or more user preferences.

13. The system of claim 5, wherein the ranks also determined based on one or more user preferences.

14. The computer-implemented method of claim 6, wherein the ranking of nodes is also based on one or more user preferences.

15. The computer-implemented method of claim 9, wherein the ranks of the individual nodes are also based on one or more user preferences.

16. A network monitoring system for monitoring a network, wherein said network comprises a plurality of logical groupings of nodes defined by a user, said system comprising:
 a plurality of network monitoring devices each collecting traffic data from a logical grouping to which it has been assigned, wherein each logical grouping comprises a hierarchy that indicates rankings of nodes in the logical grouping, wherein each monitoring device selectively collects traffic data from the nodes in its logical grouping based on the rankings of nodes, wherein the ranking of each node is based on a position of each node within the hierarchy; and
 a central monitoring device that ranks the logical groupings relative to each other and aggregates the traffic data from the network monitoring devices based on the rankings.

17. The system of claim 16, wherein the central network monitoring system is configured to receive information related to select portions of the traffic data based on the relative rankings.

18. The system of claim 17, wherein each of the network monitoring devices have a relative ranking among the plurality of network monitoring devices, and the select portions of the traffic data sent to the central monitoring device is also based on the relative ranking of the corresponding network monitoring device.

19. The system of claim 17, wherein groups of one or more monitoring devices of the plurality of monitoring devices have an associated ranking, and the select portions of the traffic data is also based on the associated ranking of the corresponding group of network monitoring devices.

* * * * *